Patented Apr. 5, 1938

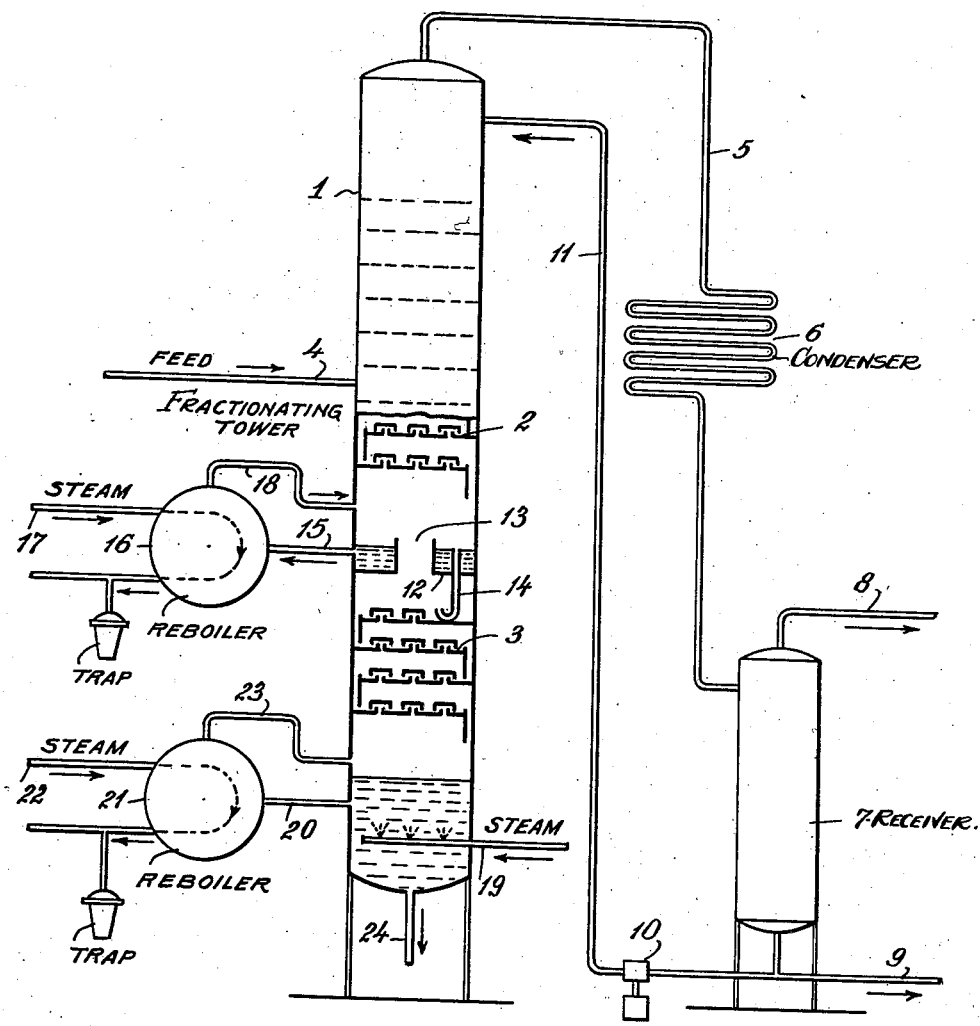

2,113,130

UNITED STATES PATENT OFFICE 2,113,130

METHOD OF DISTILLATION

George S. Dunham, Augusta, Kans., assignor to Socony-Vacuum Oil Company, Incorporated, New York, N. Y., a corporation of New York Application August 17, 1935, Serial No. 36,625

2 Claims. (Cl. 202—41)

This invention relates to distillation and fractionation, and is specifically concerned with methods of distillation wherein a heated feed, either in the form of vapor or a mixture of vapor and liquid, is fed to a point in a fractionating column intermediate its ends, the lighter portions of the feed being rectified in the portion of the tower or column above the feed inlet location, and the heavier portions of the feed being stripped in the portion of the tower or column below the feed inlet.

This method of distillation is quite widely practiced on a multitude of materials. In the usual case, the fractionation equipment used is a bubble plate tower, and the discussion herein will be directed to such a tower, although packed towers, baffle plate towers, perforated plate towers, and stage spray contact towers are all similar in characteristics and are held to be within the purview of this invention. In the usual case, the control of the rectification of vapors in the portion of the tower above the feed inlet is by condensation and return of a portion of the overhead vapors from the tower to the top of the tower as wet reflux. Other methods, such as a total condensation and withdrawal of a portion of condensate as product, partial condensation, and the like, are also contemplated. The stripping of the liquid in the portion of the tower below the feed inlet is usually accomplished either by the addition of heat to the tower bottom by a reboiler or the like, or more commonly by the introduction of a gaseous medium, either inert or related to the distilled material, for its partial pressure effect. Both methods of stripping are herein contemplated. In the exemplary discussion presented herein, the materials treated are hydrocarbons. The conditions of the treatment are general in nature, and the use of hydrocarbons is exemplary only and not intended to be limiting.

In the operation of fractionation pointed out, as practiced in the usual manner, sacrifices in efficiency are taken because the present method links together two operations quite different in requirements, and each must sacrifice something to enable its combination with the other. In the rectification section above the feed plate, the most complete fractionation is obtained when the ratio of liquid passing down the tower is relatively great in proportion to the vapor going up. In the stripping section below the feed plate, the most complete stripping is obtained when the ratio of vapor going up the tower is relatively great in proportion to the liquid going down the tower. In customary practice, it is not possible to attain these conditions, since the liquid passing down the tower above the feed plate is roughly equal in amount to the reflux fed the top of the tower, and it is increased at the feed plate by the addition of the unvaporized liquid from the feed, while the vapors going up the stripping section are those stripped from the liquid, which are relatively small in amount, plus the inert stripping medium, if any is used, and at the feed plate these are increased by the addition of the vaporous portions of the feed. Thus it may be seen that the conditions at the feed plate result in adding to each section of the composite tower a portion of ingredient which serves to alter the desired liquid to vapor ratios in a direction away from most efficient operation, and the operation of the composite tower is in effect a compromise between the two functions.

It is an object of this invention to provide a method of operation of such a composite tower wherein the liquid to vapor ratio in the rectification and stripping sections may be adjusted independently in such a manner as to secure desirable conditions of operation in each. A further object is the provision of apparatus wherein this desirable method of operation may be carried out.

In order that this invention may be adequately understood, reference is now made to the drawing attached to and made a part of this specification. The single figure of this drawing shows in somewhat diagrammatic form a distillation apparatus capable of functioning according to the method of this invention. In the drawing, 1 designates a fractionating tower of bubble cap type, composed of rectification section 2 and stripping section 3. Heated feed in the form of a mixture of vapor and liquid is fed to the tower 1 through pipe 4. Tower overhead product is removed through pipe 5 to condenser 6, and condensate is collected in receiver 7. Uncondensed gases may be removed from the system by pipe 8, and product by pipe 9. A pump 10 serves to return a portion of the condensed tower overhead product through pipe 11 to the top of tower 1 for control thereof. A short distance below the feed inlet 4 there is placed a collecting tray 12, whereon a body of liquid may collect. This tray 12 is provided with a central stack 13 for the passage of vapors from below, and with a downflow pipe 14 so located as to cause the collection of a pool of oil on tray 12. A pipe 15 connects this pool of oil with a reboiler 16, which is heated by steam or other medium introduced through line 17 to pass through closed coils in reboiler 16. Vapors from reboiler 16 are returned to the tower through pipe 18. Oil overflowing from tray 12 through pipe 14 enters stripping section 3, and passing down therethrough, collects in a pool at the bottom. Steam, or other inert gas for stripping may be introduced through perforated pipe 19. Liquid from this pool may pass through pipe 20 to reboiler 21, which is likewise heated with closed coils which are fed heating mediums through pipe 22. Vapors from reboiler 21 return to the stripping section 3 through pipe 23 and stripped bottom product may be withdrawn through pipe 24.

The manner of operating this fractionating system is as follows: The amount of vapor rising through the section above the feed plate has as a minimum quantity, the portion of vaporized feed plus the vapors from stripping. These are relatively fixed for constant feed. To fractionate, I introduce reflux, securing better fractionation as more reflux is added. The amount of reflux added was heretofore limited to that amount which could be handled by both sections of the tower working together. Now, as much reflux can be added as is desired, since it can be prevented from passing to the stripping section by the addition of heat in reboiler 16. Thus, any desired ratio of reflux to overhead vapor can be obtained in the fractionating section and the effects of such increased refluxing are not passed on to the stripping operation.

The downflow through pipe 14 tends to pass to the stripping operation a relatively constant quantity of liquid. To obtain the relatively high ratio of vapor to liquid desirable for adequate stripping, the vapors may be generated in reboiler 21, with or without the addition of steam or other inert gas through pipe 19.

It will be observed that the two sections of the fractionating system, when operated after the disclosure of this invention, really assist each other rather than working in opposite directions. For each increase in the amount of vapors generated by the stripping reboiler, a corresponding amount of heavy vapors passes stack 13 to be condensed in the fractionating section 2 and contributes to the desired increase of reflux therein.

The method of distillation herein set forth may be practiced at any pressure level below that corresponding to the critical temperature level for the materials undergoing distillation.

I claim

1. A process of fractional distillation comprising the steps of heating a feed stock to a temperature at which it is at least partially vaporous, introducing the heated feed into a fractionating tower at a point intermediate the ends thereof and separating it therein into vapor and liquid fractions, subjecting the vapors to rectification above the point of feed by contact with reflux liquid, collecting the liquid of the feed together with the reflux liquid in a pool immediately below the point of feed, supplying heat to the liquid in said pool, passing a portion of the liquid from the pool to the section of the fractionating tower below the point of feed, contacting it therein with a stream of rising vapors, passing said stream of rising vapors into the bottom of the rectifying portion of the tower, collecting remaining liquid in a pool at the bottom of said fractionating tower, and supplying heat to said pool to generate such rising stream of vapors, whereby the best ratio of vapor and liquid for fractionating and stripping may be adjusted independently in the portions of the fractionating tower respectively used for such operations.

2. A process of fractional distillation comprising the steps of heating a feed stock to a temperature at which it is at least partially vaporous, introducing the heated feed into a fractionating tower at a point intermediate the ends thereof and separating it therein into vapor and liquid fractions, subjecting the vapors to rectification above the point of feed by contact with reflux liquid, collecting the liquid portion of the feed together with the reflux liquid in a pool immediately below the point of feed, supplying heat to the liquid in said pool, passing a portion of the liquid from the pool to the section of the fractionating tower below the point of feed, contacting it therein with a stream of rising vapors, passing said stream of rising vapors to the rectifying portion of the tower, introducing a vaporous medium to the bottom of the tower to supply a portion of such stream of rising vapors, collecting remaining liquid in a pool at the bottom of said fractionating tower, and supplying heat to said pool to generate an additional portion of said rising stream of vapors whereby the best ratios of vapor and liquid for the fractionating and stripping may be adjusted independently in the portions of the fractionating tower respectively used for such operations.

GEORGE S. DUNHAM.